(12) United States Patent
Barbier et al.

(10) Patent No.: US 6,508,088 B1
(45) Date of Patent: Jan. 21, 2003

(54) ELECTRONIC ANTITHEFT SYSTEM FOR A MOTOR VEHICLE

(75) Inventors: Stéphane Barbier, Briis sous Forges (FR); Fabrice Giacomin, Saint Pierre le Moutier (FR); Louis Canard, Nevers (FR)

(73) Assignee: Valeo Securite Habitacle, Creteil (FR)

( * ) Notice: Subject to any disclaimer, the term of this patent is extended or adjusted under 35 U.S.C. 154(b) by 2 days.

(21) Appl. No.: 09/790,803

(22) Filed: Feb. 23, 2001

(30) Foreign Application Priority Data

Feb. 23, 2000 (FR) .............................................. 00 02274

(51) Int. Cl.[7] .............................................. B60R 25/02
(52) U.S. Cl. .......................................... 70/186; 70/252
(58) Field of Search ........................ 70/182, 183, 184, 70/185, 186, 187, 245, 247, 248, 252

(56) References Cited

U.S. PATENT DOCUMENTS

| 3,858,055 | A | * | 12/1974 | Tregurtha | 200/568 |
| 5,634,358 | A | * | 6/1997 | Myers | 70/185 |
| 6,349,579 | B1 | * | 2/2002 | Canard | 70/186 |
| 6,354,117 | B1 | * | 3/2002 | Canard | 70/186 |
| 6,354,118 | B1 | * | 3/2002 | Frick et al. | 70/186 |

FOREIGN PATENT DOCUMENTS

| DE | 03724705 A1 | * | 5/1988 |
| EP | 0742127 | | 11/1996 |
| FR | 02635060 A1 | * | 2/1990 |
| FR | 2748710 | | 11/1997 |
| FR | 2767767 | | 3/1999 |
| GB | 2344090 | | 5/2000 |
| WO | 9914085 | | 3/1990 |

* cited by examiner

*Primary Examiner*—Anthony Knight
*Assistant Examiner*—Michael J. Kyle
(74) *Attorney, Agent, or Firm*—Liniak, Berenato & White

(57) ABSTRACT

The invention provides a system comprising an antitheft mechanism (20) comprising a housing (22) in which a member (24, 26, 38) for manually controlling the starting of the vehicle engine and the locking of the steering can move axially (26, 38) between a pulled position in which it locks the steering and a pushed position in which it unlocks the steering, is mounted so that it can rotate (24, 26, 38) between an angular position of rest and an angular position of use, and is connected in terms of rotation to a cam (132) for controlling the latch bolt (36, 122), wherein the antitheft system comprises an electromagnet (30) for immobilizing the control member (24, 26, 38) in terms of rotation with respect to the housing (22, 28), the release of which is controlled when an encoded antitheft signal is supplied by the identification unit to an electronic circuit that controls the immobilizing member and a switch (32, 70) which triggers an interrogation and identification step, which is carried by the housing (22, 28, 62) and is triggered by the manual control member (24, 26).

19 Claims, 13 Drawing Sheets

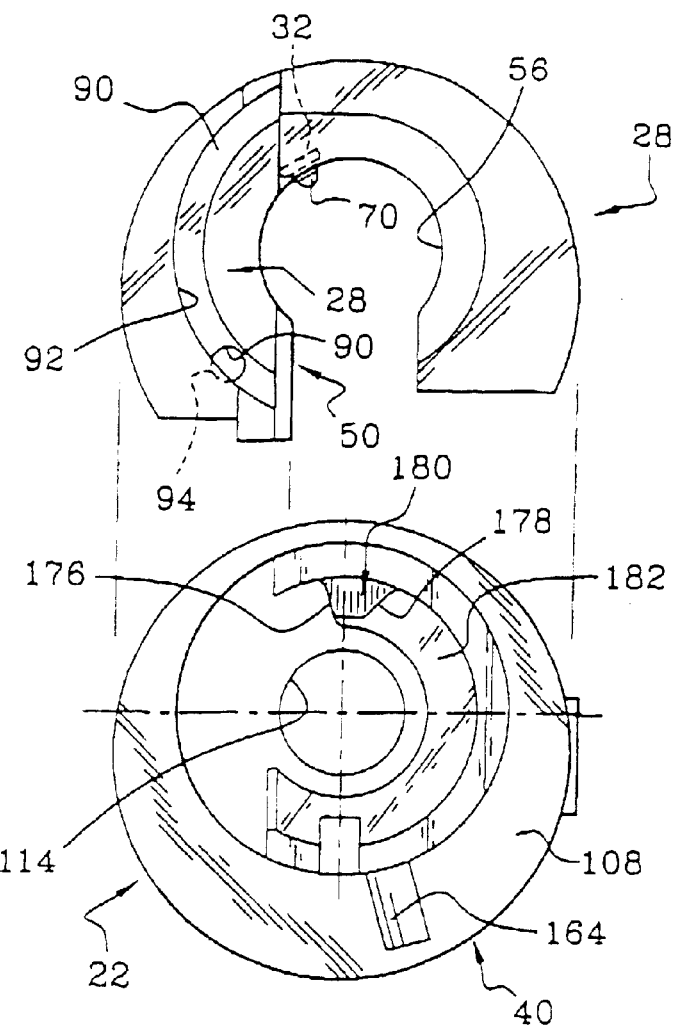
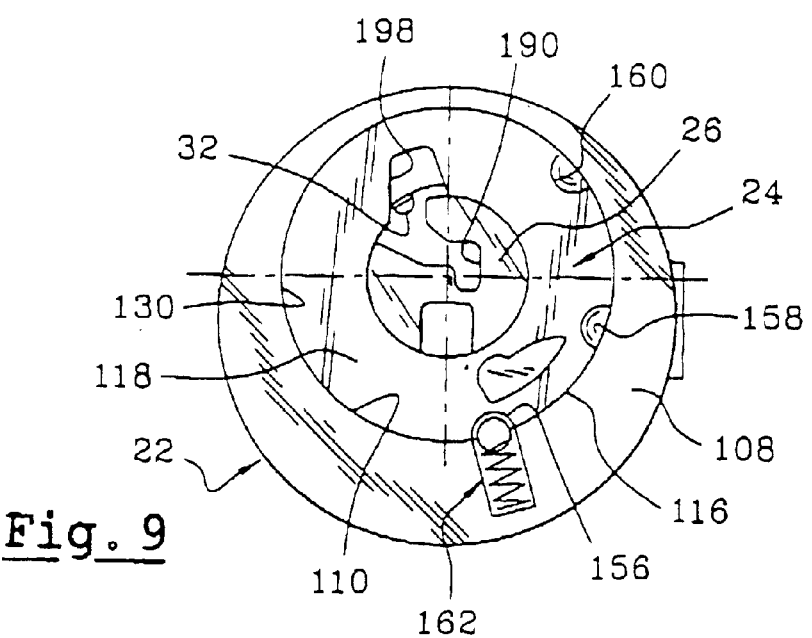
Fig. 8
Fig. 9

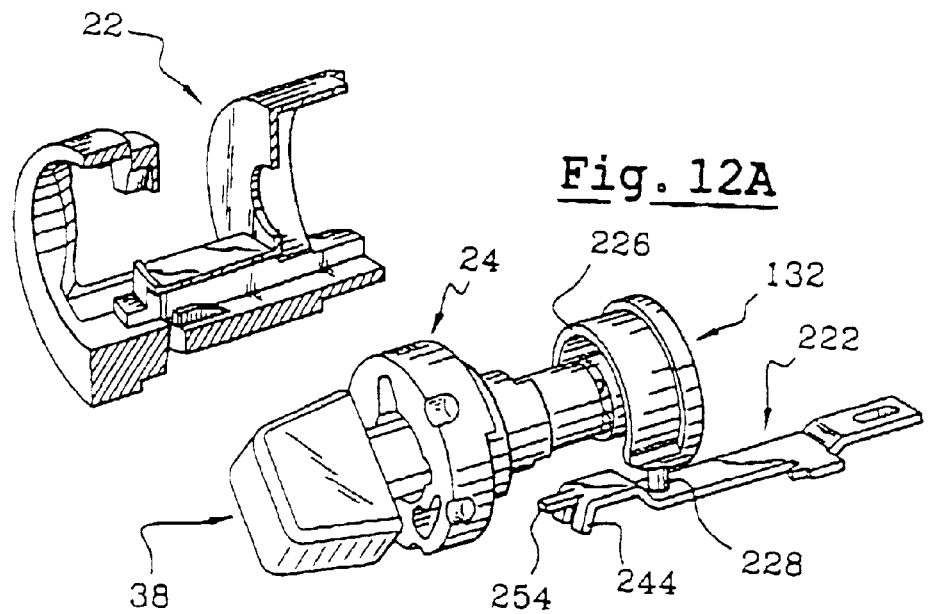
Fig. 12A
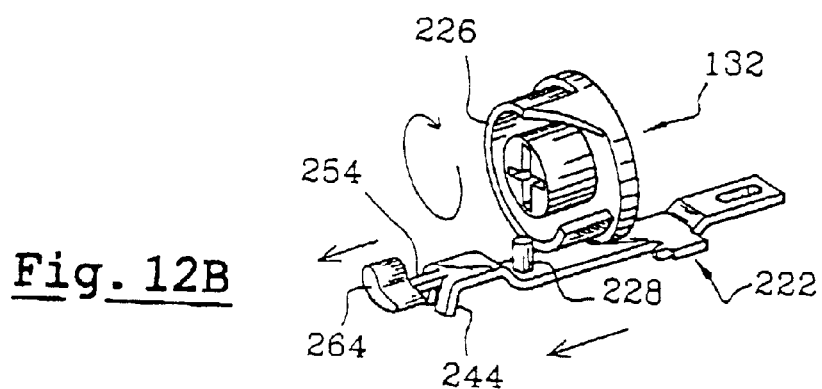
Fig. 12B
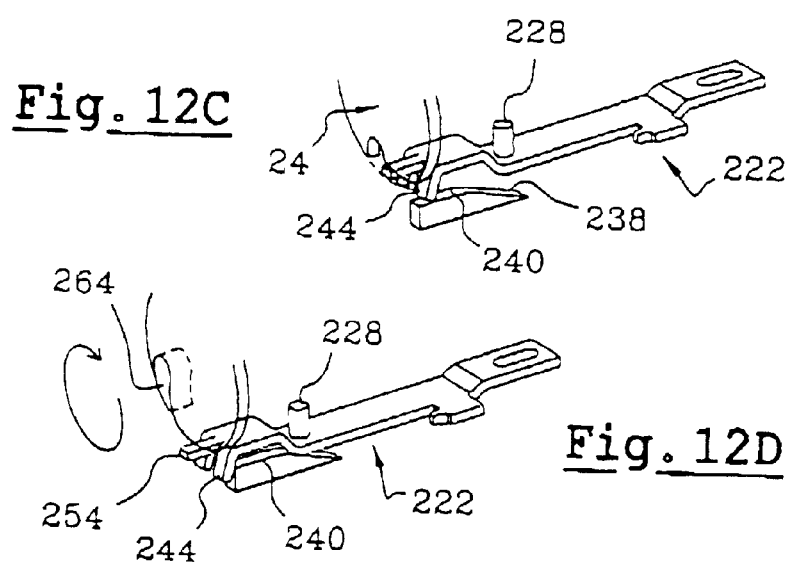
Fig. 12C
Fig. 12D

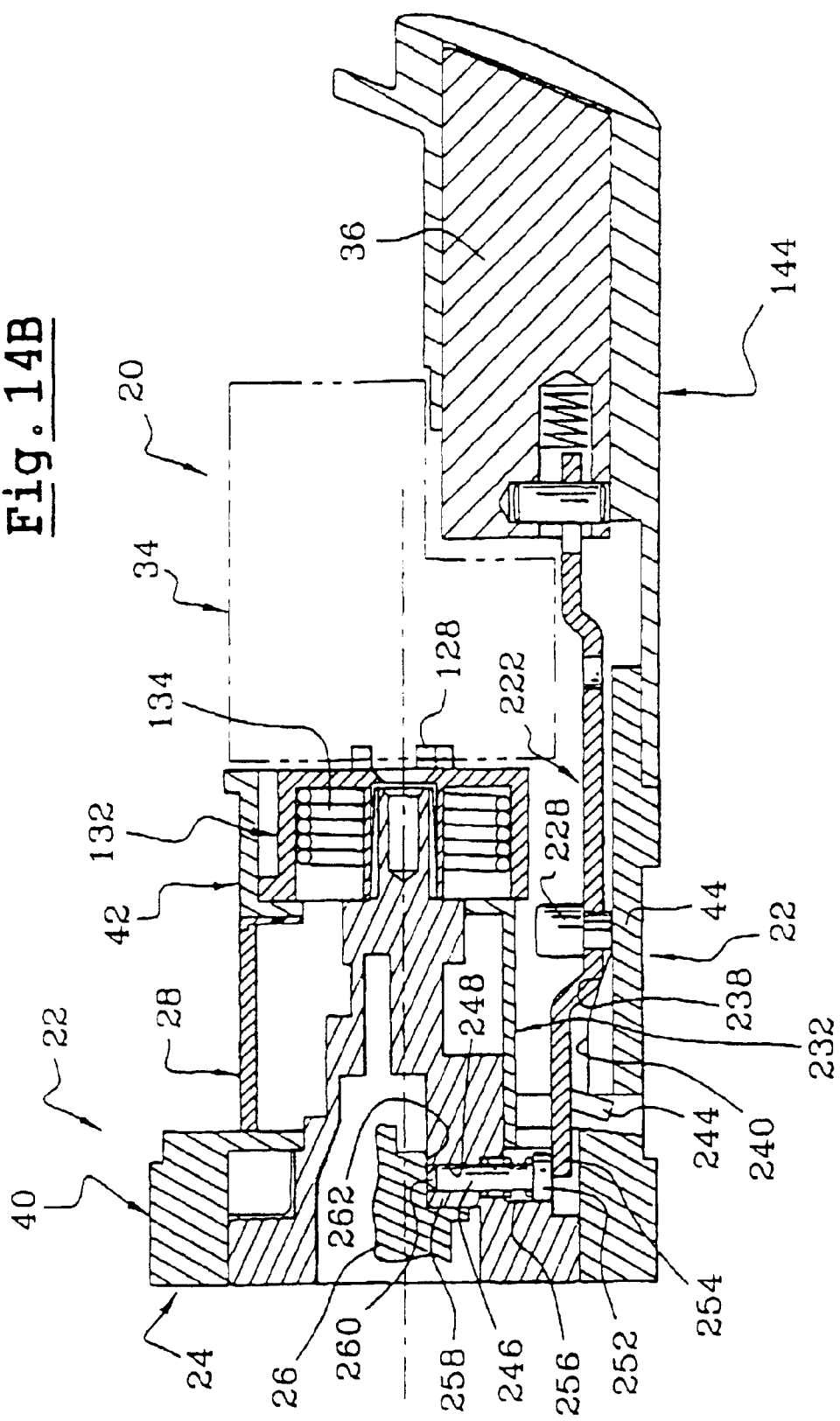

ELECTRONIC ANTITHEFT SYSTEM FOR A MOTOR VEHICLE

BACKGROUND OF THE INVENTION

1. Field of the Invention

The present invention relates to a motor vehicle antitheft system of the type comprising an antitheft mechanism comprising a housing in which a member, particularly a key, for manually controlling the starting of the vehicle engine and the locking of the vehicle steering column is inserted and used in order, on the one hand, to unlock, or release, one shaft of the vehicle steering column in terms of rotation and, on the other hand, to control the starting of the engine and, conversely, to stop the engine and lock or immobilize the steering column shaft again.

2. Description of the Related Art

More particularly, the manual control member is mounted so that it can move axially between a pulled back position in which it locks the steering column and a pushed forward position in which it unlocks the steering column.

It is mounted so that it can rotate between at least one angular position of rest and one angular position of use, for example of starting or operating the engine, in which, so as to avoid accidentally immobilizing the steering column during use, particularly when the vehicle is traveling along, it cannot be pulled axially back.

The manual control member is connected in terms of rotation to a rotary output member forming a cam which is capable of collaborating with a control finger carried by a latch bolt to control the movements of the latter which is mounted to slide in the housing between a deployed antitheft position toward which it is elastically urged and in which it projects through an opening of the housing to immobilize in terms of rotation one member of the steering column when the control member is in the angular position of rest and in the pulled back locked position, and a pushed-in position retracted inside the housing.

Finally, it is connected in terms of rotation to a multi-position switch/interrupter assembly for powering various corresponding electrical circuits, of which there are usually four, and which include, in succession, a "STOP" position (corresponding to the extreme angular position of rest of the manual control member), a "+ACCESSORIES" position, a "+CONTACT" position and a "START" position (corresponding to the other opposite extreme angular position).

In a so-called "mechanical" design of such an antitheft system, the manual control member is a key, the shank of which is accommodated axially in the barrel of a lock which, when the key is the right key, allows an output rotor to be turned to control the antitheft latch bolt and the multi-position rotary interrupter.

Successive evolutions in such a type of antitheft system have culminated in particularly reliable and compact designs, it being possible in particular for the entire antitheft mechanism with its lock to be housed as a single unit in a tube adjacent to the steering column of reduced dimensions with, in particular, in the case of the products marketed by the applicant, an inside diameter of the order of about 35 mm.

The general desire among motor manufacturers to standardize components and equipment within a range of vehicles, and for the various versions of the same model, in particular culminates in a standardization of the overall design of the steering column and of its antitheft mechanism, more particularly the design of the electromechanical cam-latch bolt-interrupter assembly which, in addition, has to meet a collection of legal standards which further complicate its design and homologation.

However, it has also been found that it is desirable for certain vehicles to be fitted with more reliable, so-called "secure" antitheft systems, while at the same time improving the comfort of use and in particular the ergonomics of manipulation while at the same time meeting the standards, which entails resorting to a manual control member that can move axially and in terms of rotation in order to carry out the aforementioned maneuvering cycles.

In an "electronic" antitheft system of this type, the coding of the antitheft system is no longer obtained by the matching of the right key with a barrel-type lock, but is obtained by means of an electronic identification device which in particular comprises an electronic identifier belonging to the authorized user and a unit for identifying an authorized user of the vehicle, fitted onboard the vehicle and which supplies an encoded antitheft signal when the correct identifier is recognized.

The electronic device is of the so-called "hands-free" type where all of the interrogation and recognition or identification steps are performed without the user having to perform any maneuver or particular action other than those which allow him to enter the vehicle.

It may also be of the type in which the user has possession of an identifier in the form of a badge which he introduces manually into a housing onboard the vehicle.

Designs have thus been proposed in which the manual member for controlling the antitheft mechanism is a control knob replacing the key and which is permanently on the vehicle and in which designs it is associated with a motorized, particularly electromagnetic, member for immobilizing the control knob in terms of rotation, disabling or retraction of which, with a view to releasing the knob, is controlled by an electronic control circuit when an encoded antitheft signal is supplied by the identification unit.

Various examples of such a design are described for example and depicted in document EP-A-0742127. It is noted, however, that these examples do not meet the legislation because the immobilization or release of the steering column shaft are not brought about by an axial movement of the operating knob.

Another example is described and depicted in document WO-A-99/14,085 in which the manual control member is of a design that meets the standards whereby it is necessary for it to be manipulated axially and in terms of rotation in order to release or to immobilize the steering column shaft. It will, however, be noted that the overall ergonomics of the system are not satisfactory as far as the user is concerned because it is impossible for the user to determine whether the inability to rotate the operating knob is the result of defective operation of the identification system and/or of the identification.

In general, the ergonomics are not the same, from the user's point of view, as those of a "mechanical" antitheft system to which he may have been accustomed, and in which introducing the key into the lock then starting to turn it corresponds to an identification step.

SUMMARY OF THE INVENTION

In order to remedy these drawbacks while at the same time offering a great deal of compactness allowing a mechanical system or an electronic system to be adapted easily to one and the same vehicle, the invention proposes a motor vehicle antitheft system of the type comprising an antitheft mechanism comprising a housing in which a member for manually controlling the starting of the vehicle engine and the locking of the vehicle steering column

- is mounted so that it can move axially between a pulled back position in which it locks the steering column and a pushed forward position in which it unlocks the steering column,
- is mounted so that it can rotate between at least one angular position of rest and one angular position of use (particularly for starting the engine), in which it cannot be pulled axially back,
- is connected in terms of rotation to a rotary output member forming a cam which is capable of collaborating with a control finger carried by a latch bolt to control the movements of the latter which is mounted to move with respect to the housing between a deployed antitheft position toward which it is elastically urged and in which it projects through an opening of the housing to immobilize in terms of rotation one member of the steering column when the control member is in the angular position of rest and in the pulled back locked position, and a pushed-in position retracted inside the housing,
- and is connected in terms of rotation to a switch/interrupter assembly, which system comprises a unit for identifying an authorized user of the vehicle, which, after an interrogation and identification step, emits an encoded antitheft signal, and wherein the antitheft mechanism comprises:
- a motorized, particularly electromagnetic, member for immobilizing the control member in terms of rotation with respect to the housing, the release of which is controlled when an encoded antitheft signal is supplied by the identification unit to an electronic circuit that controls the immobilizing member;
- and a switch which triggers an interrogation and identification step, which is carried by the housing and is triggered by the manual control member.

As claimed in other features of the invention:

- the manual control member comprises an axially inclined ramp for controlling the triggering switch which acts on an actuating member thereof when the manual control member is pushed in or pulled axially between its two extreme axial positions, namely the pulled back locked position and the pushed forward unlocked position;
- means are provided for axially indexing the manual control member in each of its two extreme axial positions;
- the triggering switch comprises an actuating member on which the manual control member acts when it is rotated from its extreme angular position of rest to its position of use, or in the opposite direction;
- the actuating member is an actuating ball with which the control ramp or a lateral flank of the control member collaborates;
- the control ramp is extended axially backward by a cylindrical bearing parallel to the axis and is delimited laterally by said lateral flank;
- the control member comprises a rotor which is mounted so that it can rotate with respect to the housing which forms a stator, between two extreme angular positions, one of which corresponds to said angular position of rest and which is immobilized axially with respect to the stator, and a control rod which is mounted so that it can slide axially with respect to the rotor, to which it is connected in terms of rotation, between a pulled back locked position and an extreme forward unlocked position;
- said ramp is formed on the control rod;
- means are provided for axially indexing the control rod with respect to the rotor in each of its two extreme axial positions;
- the control rod has a radial finger for axially holding the control rod in the pushed forward position which, when the rotor leaves its angular position of rest, extends facing a front annular transverse abutment face of the stator to prevent the control rod from retreating axially backward and which, when the rotor is in its angular position of rest, faces a complementary axial groove so as to allow the axial movements of the control rod in both directions between its two extreme axial positions;
- the electromagnetic member for immobilizing the control member in terms of rotation collaborates with the rotor to immobilize it in terms of rotation;
- the electromagnetic immobilizing member is an electromagnet of axial orientation, the core plunger of which is urged elastically into the deployed position by a return spring so that it is housed in at least one immobilizing notch formed in an element connected in terms of rotation to the control member when the latter is in its angular position of rest, and it can be electromagnetically returned to the pushed-in position so as to release the control member in terms of rotation;
- the immobilizing notch is formed in an annular front face of the rotor of the manual control member;
- the electromagnetic immobilizing member and the triggering switch belong to a subassembly constituting a disassemblable part of the housing;
- the disassemblable part is of annular overall shape and has the manual control member passing axially through its center;
- the disassemblable part comprises a printed circuit board in the shape of a flat annulus oriented transversely which carries said switch and the electromagnetic immobilizing member;
- the latch bolt is mounted so that it can slide axially parallel to the axial direction of travel of the manual control member;
- the latch bolt is mounted so that it can slide in a direction which is generally radial with respect to the axial direction of travel of the manual control member;
- the rear axial end of the control rod is connected in terms of axial translation and in terms of rotation to an operating knob by "fuse" means which break under the action of a torque of determined value.

BRIEF DESCRIPTION OF THE DRAWINGS

Other features and advantages of the invention will become apparent from reading the description which will follow, for an understanding of which reference will be made to the appended drawings, in which:

FIG. 8 is an end-on rear axial view in the direction of arrow F8 of FIG. 6, depicting the stator and the cassette in an exploded position;

FIG. 9 is a view similar to that of FIG. 8, in which the cassette is in a position mounted in the stator, without the manual control rod, in the angular position of rest;

FIG. 12A is a view similar to that of FIGS. 1 and 3 depicting, in an exploded view, part of the stator and the rotor assembled with the control rod and the output member forming a cam for controlling the axial movements of the latch bolt which acts on the shank thereof, the rotor being in an extreme angular position of rest with the manual control rod in the pulled back position and the latch bolt in the deployed antitheft position;

FIG. 12B is a partial view similar to that of FIG. 12A, in which the latch bolt shank is in the pushed-in position;

FIGS. 12C and 12D are views similar to those of FIGS. 12A and 12B illustrating other relative positions of the rotor, the stator and the latch bolt shank;

FIG. 14B is a view similar to that of FIG. 14A in which the latch bolt is in the pushed-in rear axial position.

DETAILED DESCRIPTION OF THE PREFERRED EMBODIMENTS

Figure 2:
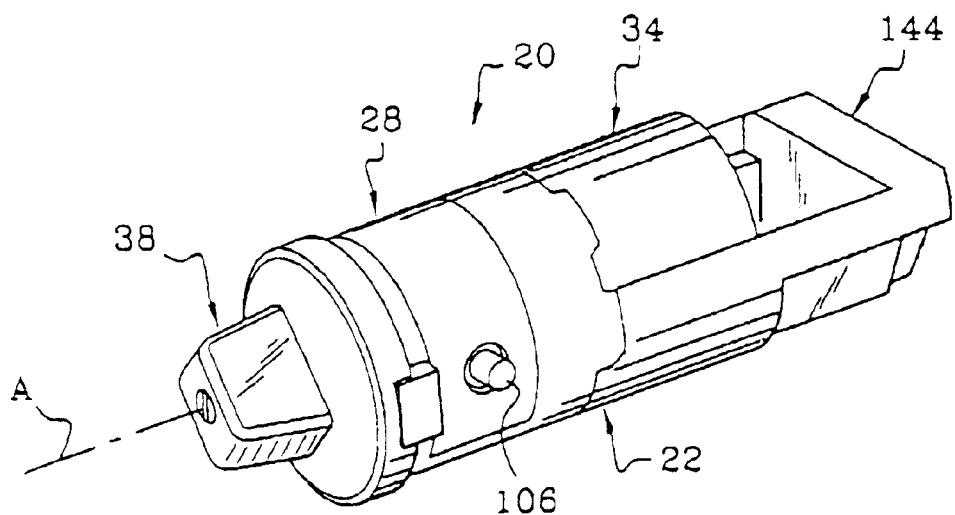
FIG. 2 is a view similar to that of FIG. 1, in which the components are depicted in an assembled position.

As can be seen in particular in FIG. 2, the antitheft mechanism 20 according to the invention constitutes a particularly compact assembly which can easily be incorporated into a steering column assembly of known overall design, in place of a "mechanical" antitheft mechanism according to the state of the art. In the embodiment illustrated in the figures in which the latch bolt can slide axially along the overall axis of the antitheft mechanism, the body of the latter is cylindrical overall and its outside diameter is about 34 mm, that is to say the same diameter as the body of the mechanical antitheft mechanism supplied by the applicant to its major motor manufacture customers.

Figure 1:
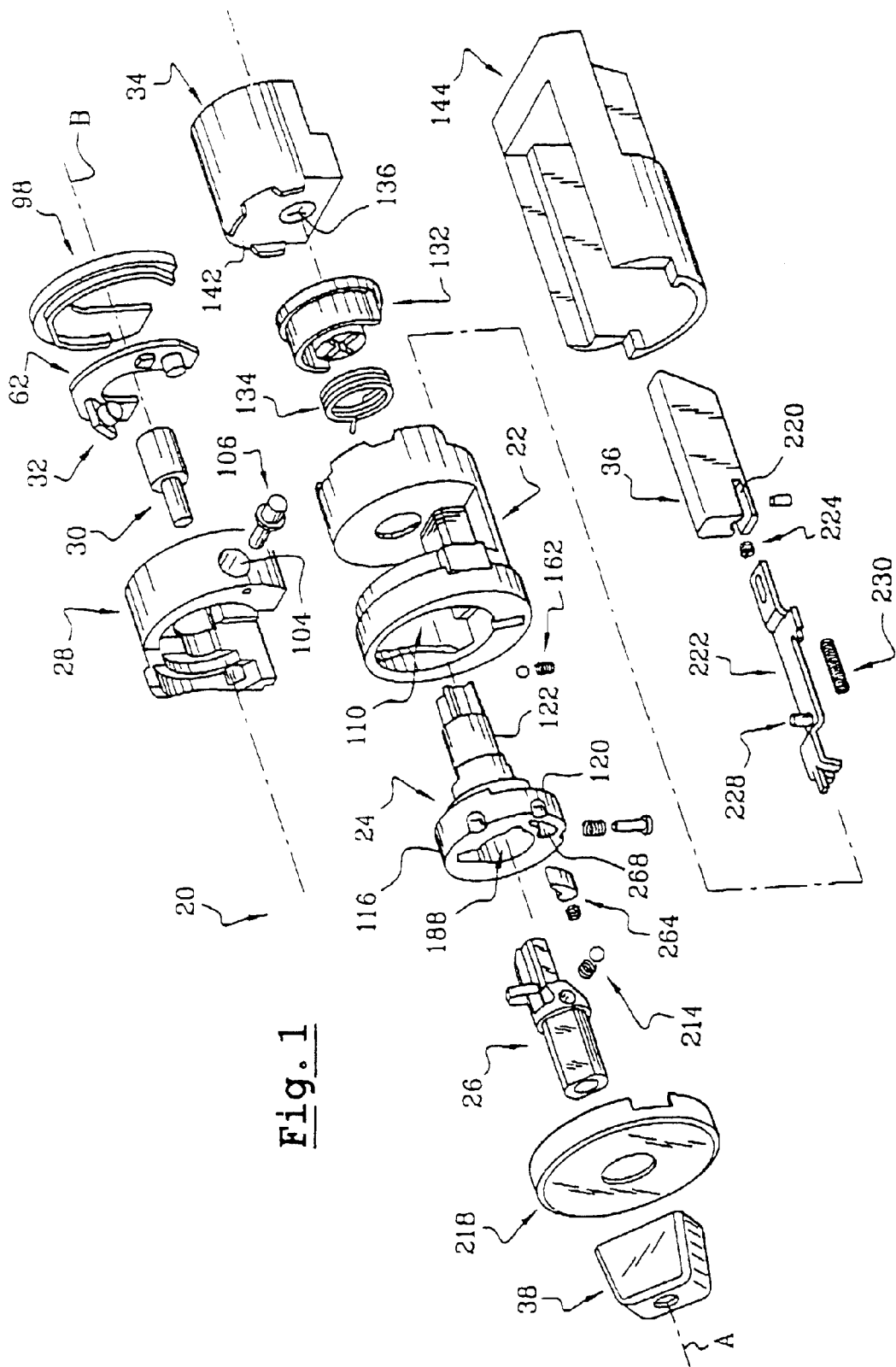
FIG. 1 is an overall three-quarters rear perspective exploded view of the main components of an antitheft system as claimed in the teachings of the invention.

By convention, and without any implied limitation, a rear-to-front orientation along the overall axis A of the antitheft mechanism will be adopted in the remainder of the description and in the claims, this being from left to right when considering FIGS. 1 and 2.

The antitheft mechanism 20 mainly consists of a stationary body or stator of cylindrical overall external shape 22, of a two-part manual control member made up of a rotor 24 and of a control rod 26, of a fixed subassembly constituting a module, or cassette 28, attached to the stator 22 and which, in particular, comprises a monostable electromagnet 30 and an electric switch 32 according to the invention, a multi-position rotary interrupter 34 connected in terms of rotation to the rotor, and a latch bolt 36 for immobilizing in terms of rotation a steering column shaft which is not depicted in the figures.

To manipulate it, the manual control member made of two parts 24 and 26 is associated with a rear manipulating knob 38 which is connected in terms of rotation and in terms of axial translation, in both directions, to the rear free end of the control rod 26 so as to drive the latter in rotation and in axial translation in both directions about and along the axis A with respect to the fixed stator 22.

As can be seen, for example, in FIG. 9, the functional axis A of rotation of the rotor 24 is off-centered with respect to the central geometric axis of the cylindrical body, particularly of the stator 22 and of the cassette 28, and this is, in particular, in order to have enough space for the latch bolt 36 and its puller.

The fixed stator 22 is a casting, for example of light alloy, which comprises a rear portion 40 of cylindrical annular overall shape, and a front portion 42 of the same shape and which are joined axially together by an intermediate portion 44 in the form of an axially oriented peripheral connecting beam. There is thus an intermediate recess or cavity 46 between the rear 40 and front 42 portions which is open radially over most of its circumference and which accommodates the cassette 28 of complementary overall shape.

More specifically, the body 48 of the cassette 28 is an alloy casting of cylindrical annular overall shape having a recess 50, which is a lower recess when considering FIGS.

1, 4 and 5, which complements the external profile of the connecting beam 44 so as to complete the overall shape of the stator and so as to be positioned and immobilized, angularly and axially, with respect to the stator 22.

The cassette 28 mainly comprises a front peripheral skirt 52, a radially oriented intermediate partition 54 with a central hole 56, and a rear unit 58 which extends over approximately half the circumference.

The front skirt 52 with the partition 54 delimits a front housing or cavity 60 of the cassette 28 which in particular accommodates a transverse printed-circuit board 62 which is a sector of a flat annulus oriented radially and which, in particular, on its rear transverse face 64, carries electronic and/or electromechanical components including the electric switch 32 and the electromagnet 30.

The electric switch 32 comprises a member controlling its triggering, which member is a spherical ball 70, the positioning of the switch 32 with its ball 70 being such that the ball projects radially overall toward the inside of the hole 56, as can be seen in particular in FIGS. 8 and 9.

The electromagnet 30 is an axially oriented electromagnet with a fixed cylindrical body 72, the axis B of which is parallel to the axis A, but radially off-centered toward the outside with respect to the axis A.

The front face 74, with its electrical connections, is fixed to the transverse rear face 64 of the board 62, while its body 72 extends into a complementary housing 76 of the body of the cassette, the front end 78 of which has an axial hole 80 of smaller diameter to allow for the passage in axial sliding of the output rod 82 of the electromagnet which is connected to the mobile core plunger 84 thereof which comprises a return spring 86 which constantly urges it toward its deployed rear axial position, that is to say when the coil of the electromagnet 28 is not electrically powered.

Figure 4:
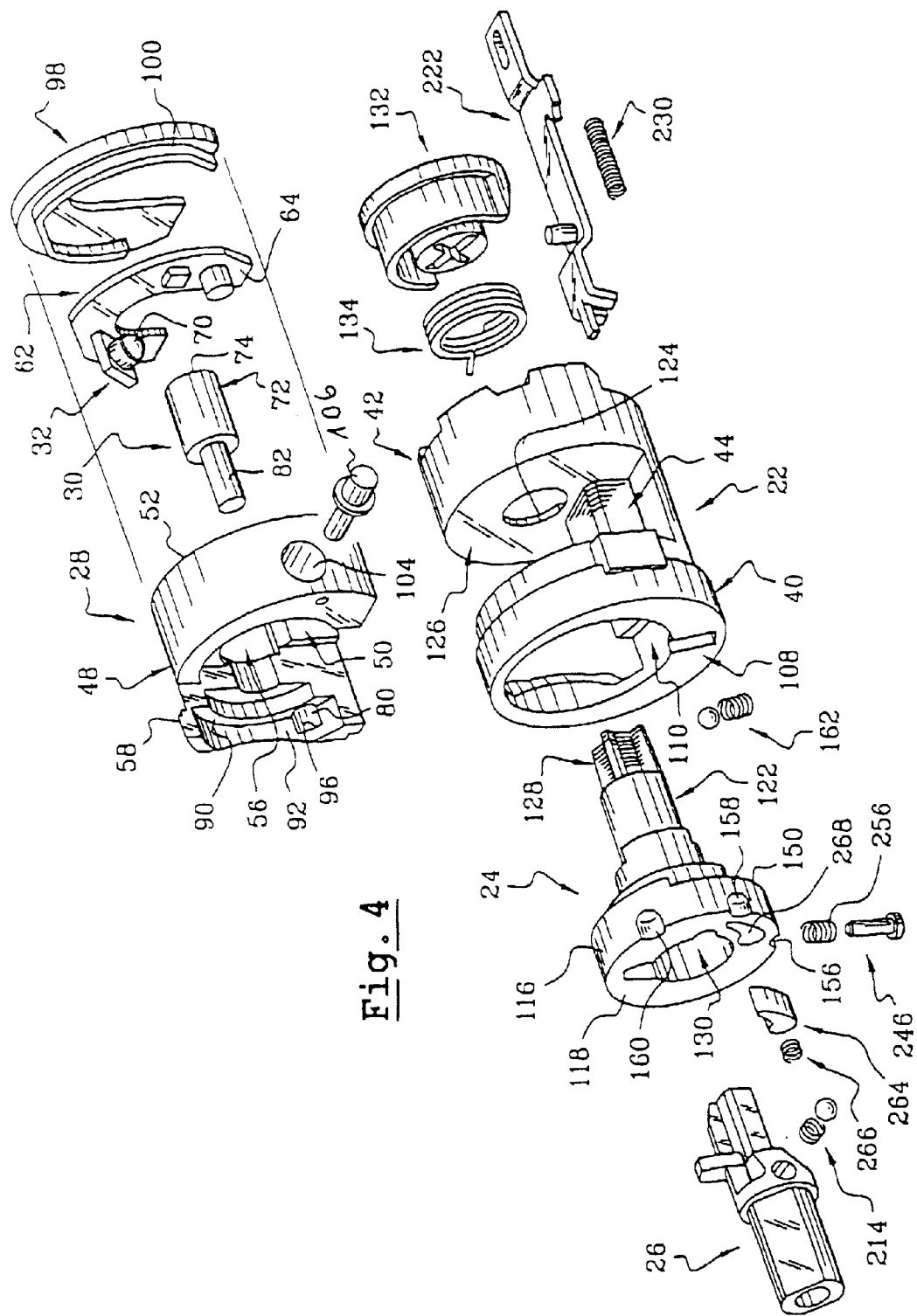
FIG. 4 is a view similar to that of FIG. 1 which illustrates, on a larger scale, the main components of FIG. 1.

As can be seen in particular in FIG. 4, the axial hole 80 opens axially toward the rear into a rear annular transverse facet 90 which is extended in part into a concave cylindrical lateral face portion 92 in the form of a recess 94.

Figure 3:
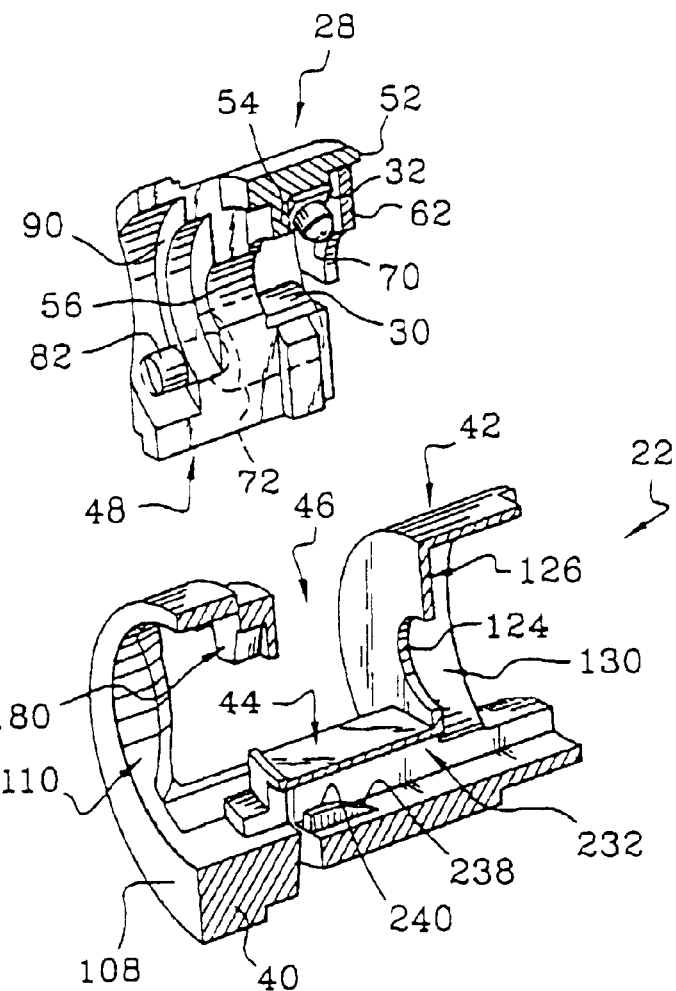
FIG. 3 is a view on a larger scale and in section on an axial mid-plane of the stator forming the housing and of the additional cassette-type module which carries the immobilizing electromagnet and its electronic control circuit.

When the rod 82 is in the axially pushed-in forward position, when the electromagnet 30 is powered, this is retracted toward the back of the facet 90 whereas, in the deployed position, and as can be seen in FIG. 3, the rear free end of the rod 82 is housed in the recess 94, the transverse rear end 96 of which constitutes an end-of-travel stop for the rod 82.

The front cavity 60, which is open axially forward so as to allow the board 62 with its components to be mounted and fitted, may be closed by an attached cover 98 which has a positioning and centering rib 100.

When the cassette 28 is in the position assembled in the intermediate housing 46, the cover 98 is particularly held axially by the rear transverse face 102 of the front portion 42.

The convex cylindrical peripheral wall of the rear portion 40 of the body of the cassette 28 also comprises, in a way which is generally known, a radial hole 104 which accommodates a radial finger 106 for fixing and immobilizing axially and in terms of rotation the stator 22–28 in a complementary tube, not depicted, of the steering column which accommodates the antitheft mechanism 20.

The rear transverse face 108 of the rear portion 40 of the stator 22 comprises a cylindrical housing 110, open axially toward the rear and delimited toward the front by the end 112, pierced at its center with a circular hole 114, which receives with rotation the complementary rear portion 116, of convex cylindrical shape, of the rotor 24.

The rear portion 116 is delimited by a rear transverse face 118 which lies flush with the face 108 (see FIG. 14A et seq.), and by a front annular transverse face 120 which, when the rotor is in the mounted position, bears axially against the rear face of the end 112.

Beyond the front face 120 of its rear portion 116, the rotor 24 is extended by a coaxial central shank 122 which extends axially through the hole 114, through the cassette 28 and its hole 56, and through the central hole 124 in the rear transverse end 126 of the front portion 42 of the stator 22.

Thus, the front free end 128 of the shank 122, shaped into a driving cross, extends axially into the front portion 42 of the stator 22, which is hollow cylindrical and open axially forward, so as to constitute a cavity 130 in which, in the known way, is arranged a cam 132 (driven in terms of rotation by the cross 128), which controls the axial movements of the latch bolt 36 according to a known design.

A spring 134 for angularly returning the cam and the rotor 24–122, when the rotor reaches the extreme angular position known as "START" corresponding to the application of power to the engine starter motor, is inserted axially between the stator 22–42 and the cam 132.

The cross 128 passes centrally through the cam 132 to be accommodated in a complementary socket 136 of the rotary interrupter 34, so as to drive this multi-position interrupter in rotation in both directions.

The body of the interrupter 34 is immobilized in terms of rotation by tabs 140 of the stator 22–42 which are housed in notches 142 of the interrupter 34 which is housed in a complementary casing 144 in which the latch bolt 36 is guided in axial sliding along an axis C parallel to the axis A and radially off-centered toward the outside.

Figure 14A:
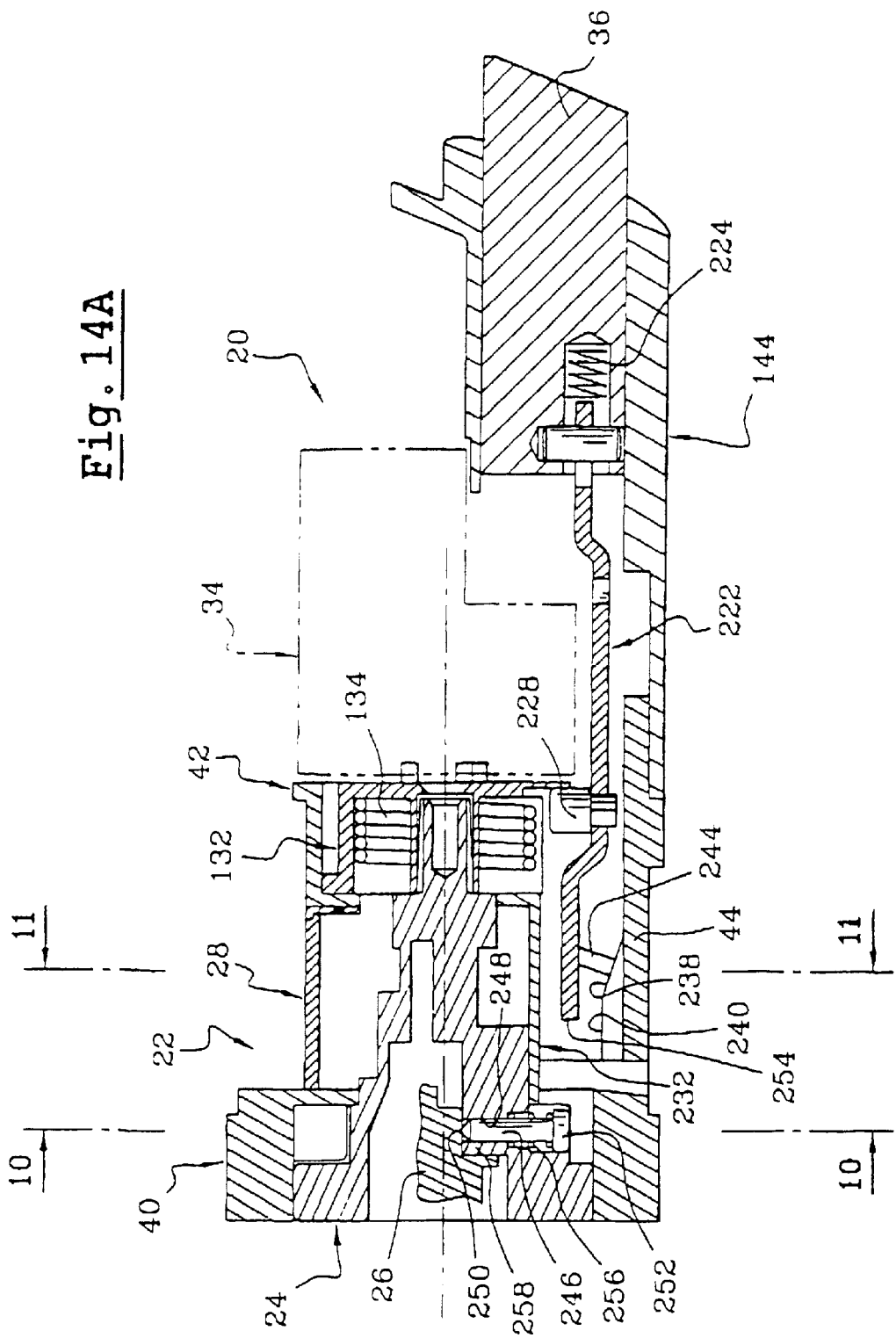
FIG. 14A is a simplified view in axial section of the main components of the antitheft system as claimed in the invention, in which the latch bolt is in the deployed forward axial position.

As can be seen in particular in FIG. 14A, the casing 144 has a corridor 146 for guiding the latch bolt 36 which opens axially at its two ends.

The front transverse face 120 of the rear portion 116 of the rotor 24 has a peripheral annular groove 150 in the shape of an arc of a circle which is extended by an adjacent notch 152 from which it is separated by an abutment partition 154. The mean radius of the groove 150 and of the notch 152 is such that they are located in line with the axis B of the electromagnet 30, of which the rod 82, and more specifically its rear free end, can be housed in the circular groove 150 or in the notch 152, depending on the angular position of the rotor with respect to the stator 22, and in particular with respect to the cassette 28.

For this purpose, the rear portion 116 is adjacent to the facet 90 and the concave cylindrical surface 92.

The cylindrical periphery of the portion 116 here comprises three notches 156, 158 and 160 for angularly indexing the rotor 24 with respect to the stator 22–40 in three favored angular positions corresponding respectively to the "STOP", "ACCESSORIES" and "ON" positions of the rotary interrupter 34. The antitheft mechanism 22 for this purpose comprises an assembly 162 having a ball and spring of radial orientation.

On its front transverse face 120, the rotor 22 comprises a sleeve 166 which extends axially forward and is extended by a sleeve tube 168 which is guided in terms of rotation in the hole 114.

By virtue of this arrangement, the cylindrical periphery 170 of the sleeve 162 is angularly delimited by two radial stops 172 and 174 which are capable of collaborating alternately with the two corresponding opposed radial faces 176 and 178 of a fixed stop 180 formed facing it in the rear annular transverse face 182 of the stator 22–40, this being so as to determine the two extreme angular positions of the rotor 24 with respect to the stator 22–40.

The rotor 22 is hollow so that centrally it can accommodate the control rod 26 which, in association with the rotor 24 and the operating knob 38, constitutes the manual control member.

For this purpose, it comprises a central bore 188 which is open axially toward the rear in the face 118 and blind at its front axial end. The profile of the bore is cylindrical at the rear and it extends forward in the form of a staircase slot 190. The front axial part of the rod 26 is the complement of this and comprises a cylindrical portion 192 and a front end portion with a staircase-shaped cross section 194.

Figure 5:
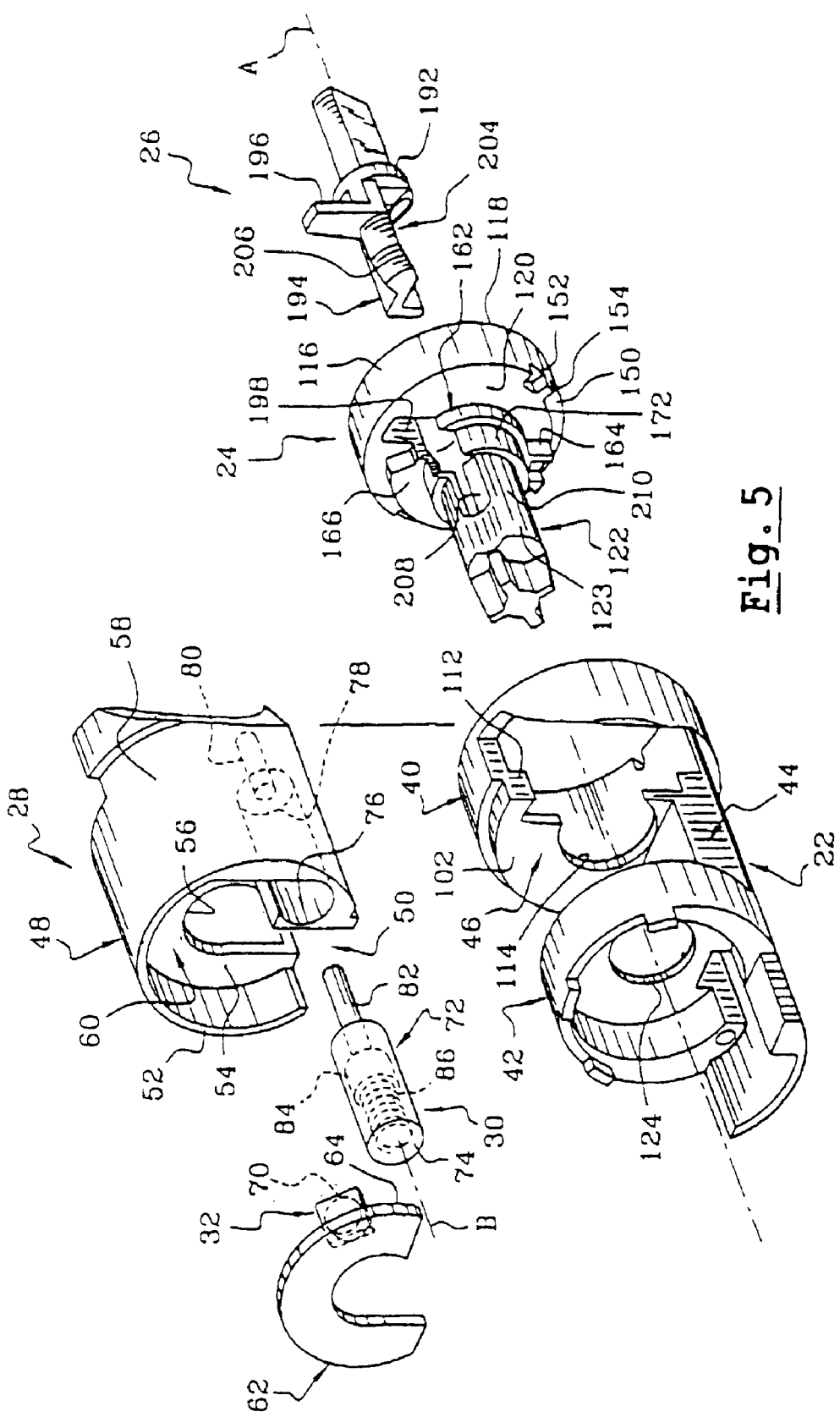
FIG. 5 is a view similar to FIG. 4, in which the components depicted are illustrated in three-quarters front perspective.
Figure 6:
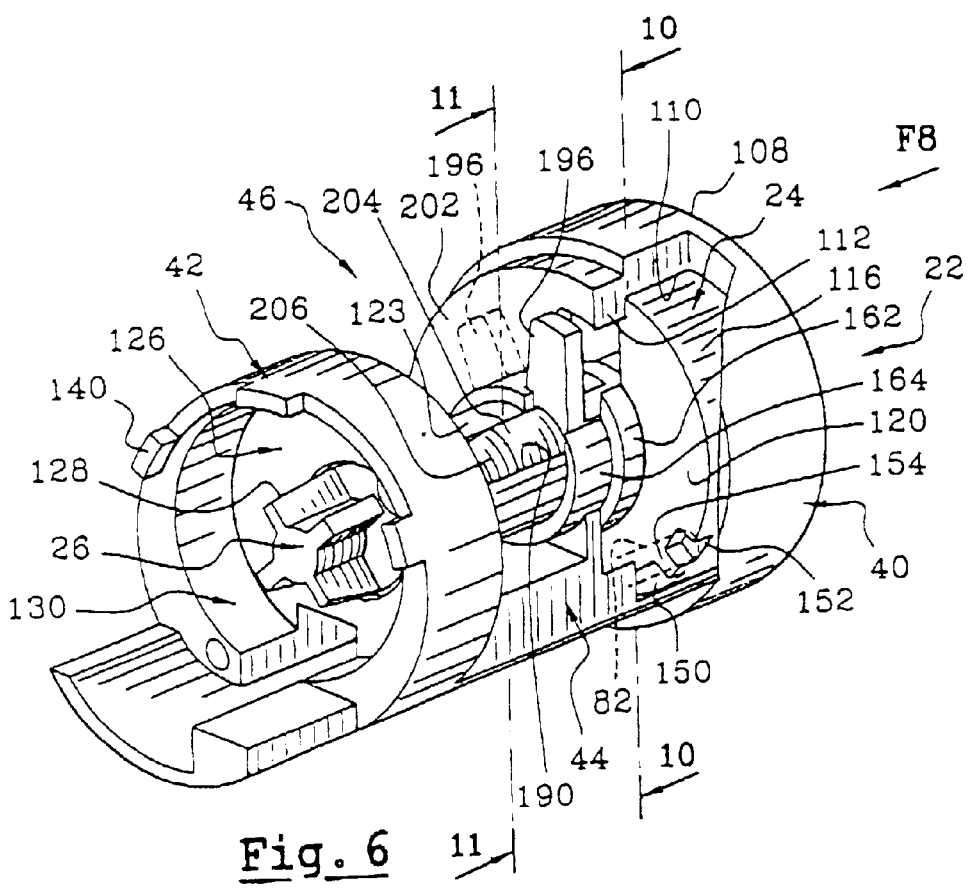
FIG. 6 is a view on a large scale and in three-quarters front perspective illustrating the stator with the rotor in the angular position of rest and the manual control rod in the pushed forward axial position.
Figure 7:
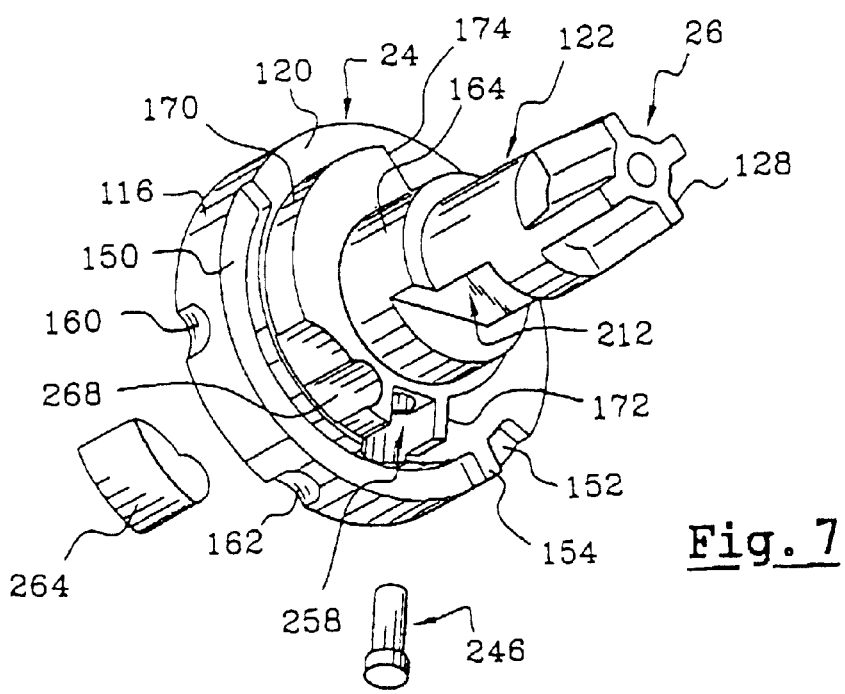
FIG. 7 is a view on a large scale and in three-quarters front perspective illustrating the rotor.
Figure 10A:
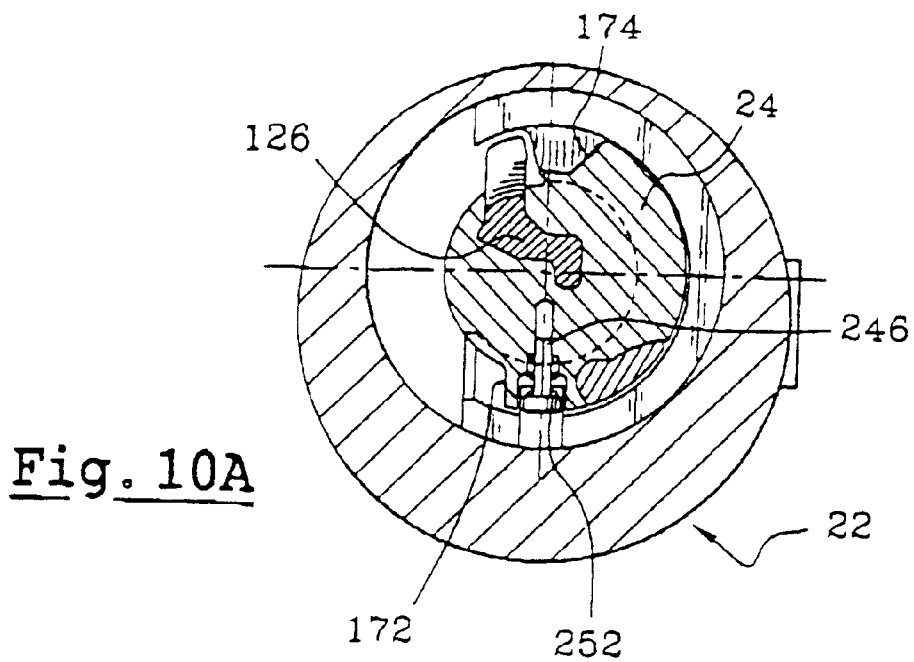
FIG. 10A is a view in section on the transverse plane 10—10 of FIGS. 6 and 14A, which illustrates the stator with the rotor and the manual control rod in the extreme angular position of rest.
Figure 10B:
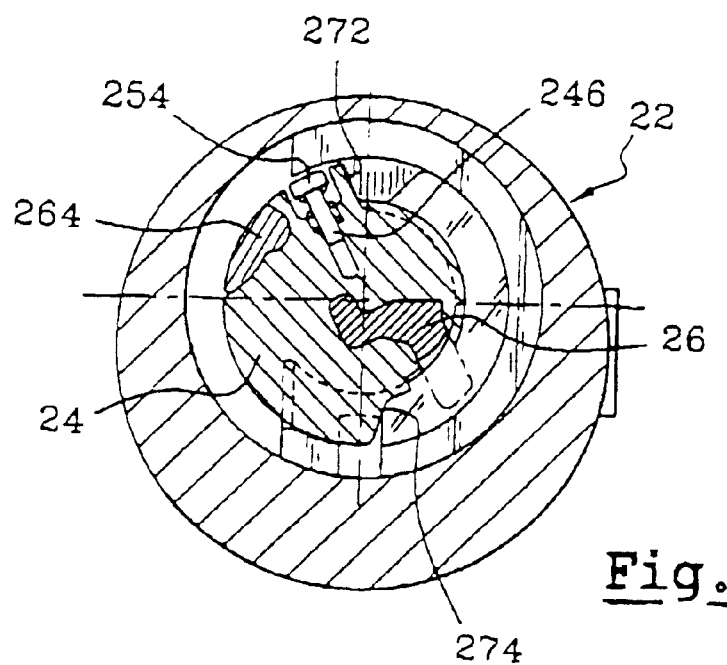
FIG. 10B is a view similar to that of FIG. 10A in which the rotor and the manual control rod are in the extreme angular position for starting.

As can be seen in particular in FIGS. 5 and 6, the rod 26 comprises an outer radial tab 196 for axially retaining the rotor with respect to the stator.

To this end, the portion 116 comprises an open axial slot 198 for the passage of the tab 196 when the rod 26 is being assembled in the rotor 24. When the rod 26 is in the assembled and mounted position in the rotor 24, and the rotor 24 is assembled and mounted in the stator 22–40 (as can be seen in FIG. 6), the position of the tab 196, when the control rod 26 is in the position pushed axially forward with respect to the rotor 24, is such that it is located forward of the front annular transverse face 202 facing it belonging to the end 112.

When the rod 26 with the knob 38 is in its "STOP" extreme angular position illustrated in FIG. 6, it can slide axially with the control knob with respect to the rotor 24 and therefore with respect to the stator 22–40, whereas if the rod and the rotor (which are always linked in terms of rotation in both directions by the collaboration of the complementary shapes 190 and 94) are rotated with respect to the stator 22, the tab becomes situated facing the face 202 and it is therefore impossible for the rod 26 to be pulled axially back.

There is thus just one single angular position of the knob and of the rod 26, that is to say the "STOP" angular position of the interrupter 34, in which the surfaces 174 and 178 are in abutment and in which the rod 82 of the electromagnet faces the notch 152. In this angular position, the rod 26 can be pulled axially back or pushed axially forward between its two extreme axial positions illustrated in FIGS. 11A and 6 (or 11B), respectively.

The front end portion 194 of the rod 26 which passes through the rotor 24 has an axial portion with a convex axial cylindrical surface 204, or lateral flank, of the same diameter as the convex cylindrical body 123 of the shank 122 and which is extended by a front axial ramp 206 which is inclined radially toward the axis and from back to front.

The body 123 of the shank 122 comprises an axial slot opening radially to the outside 208 so that the cylindrical surfaces 204 and 206 "complete" the peripheral surface 210. Thus, when the control rod 36 is in its pushed-in axial position and the rotor is in its stop extreme axial angular position illustrated in particular in FIGS. 6 and 11B, the ramp 206 collaborates with the ball 70 to force it radially outward, carry it along the cylindrical bearing surface 204 and thus actuate the switch 32.

By contrast, with the rotor in the same angular position, if the knob 38 and the control rod 26 are pulled axially back, the ramp 206 retreats axially back and no longer acts on the ball 70 of the switch, which once again changes switching state.

Thus, pushing in or pulling the rod 26 (which are possible only in the single extreme angular position known as the "STOP" position) causes a change in state of the switch 32 which is manifested by the production of a signal sent to the electronic circuit carried by the printed circuit board 62.

In the same way, when the rod 26 is in its pushed forward extreme axial position with respect to the rotor 24 and when the latter is rotated with respect to the stator 22–40, leaving the stop extreme angular position, a change in state of the switch 32 is also brought about, this being by action on the ball 70 which also in this case constitutes the member that triggers the switch 32.

To this end, and as can be seen in particular in FIGS. 7 and 11A to 11D, the portion of the cylindrical surface 123 which is adjacent to the slot 208 extends angularly only over a small angular sector 210, or lateral flank, then continues in the form of a counterbore 212 forming a recess into which the ball 70 "drops", that is to say that it is no longer pushed radially outward by the bearing surface 204 nor by the surface 123 of the sector 210.

Figure 11A:
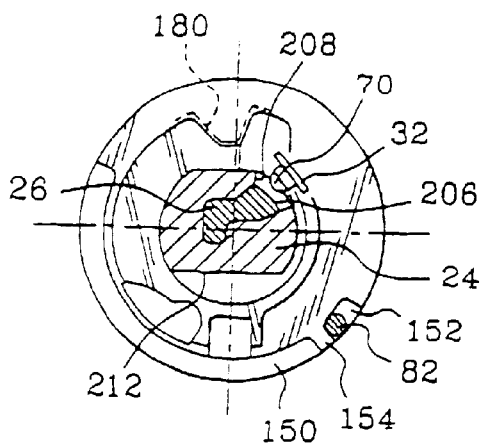
FIG. 11A is a view in section on the transverse plane 11—11 of FIGS. 6 and 14A, illustrating the rotor in the extreme angular position of rest, the manual control rod in the pulled back position, and the ball-switch of the electronic control circuit.
Figure 11B:
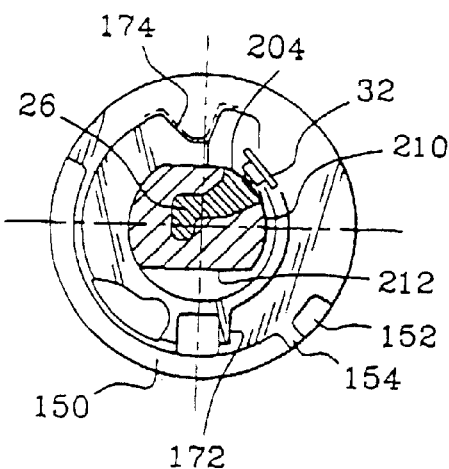
FIG. 11B is a view similar to that of FIG. 11A illustrating the rotor in the extreme angular position of rest and the manual control rod in the pushed forward position.
Figure 11C:
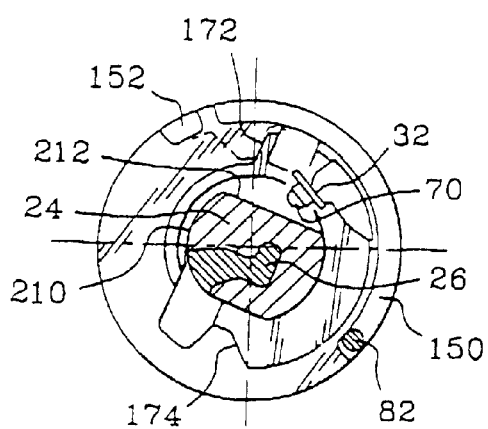
FIG. 11C is a view similar to that of FIG. 11A, illustrating the rotor in the extreme angular position for starting and the manual control rod in the pushed-forward position.

Thus, when the rotor leaves its stop extreme angular position illustrated in FIGS. 11A and 11B (after the electromagnet 30 has been operated for this purpose in order to retract the rod 82 from the notch 152 when the user has been identified as being an authorized user), in order to turn under the action of the knob 38 and in the clockwise direction, the ball collaborates first of all with the bearing surface 210 and the switch does not change state, then it drops into the recess 212, causing a change in state of the switch 32, which then causes the rod 82 to be released, which rod then moves axially forward into the groove 150. The rotor could then, for example, attain its other extreme angular position "START" corresponding to actuation of the starter motor (11C) and then return to the on position (FIG. 11D) under the action of the spring 134. As long as the rod 82 is in the groove 150 and is not retracted back by powering the electromagnet 30, it is impossible for the rotor to be returned to its stop extreme angular position (FIGS. 11A and 11B), this being because of the presence of the abutment partition 154 which separates the groove 150 from the notch 152.

Figure 11D:
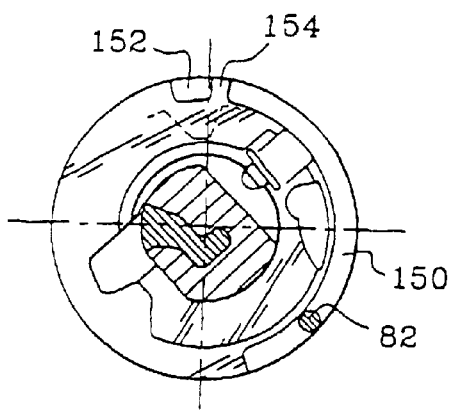
FIG. 11D is a view similar to that of FIG. 11A illustrating the rotor in an intermediate angular position for running the vehicle engine and the manual control rod in the pushed forward position.
Figure 13A:
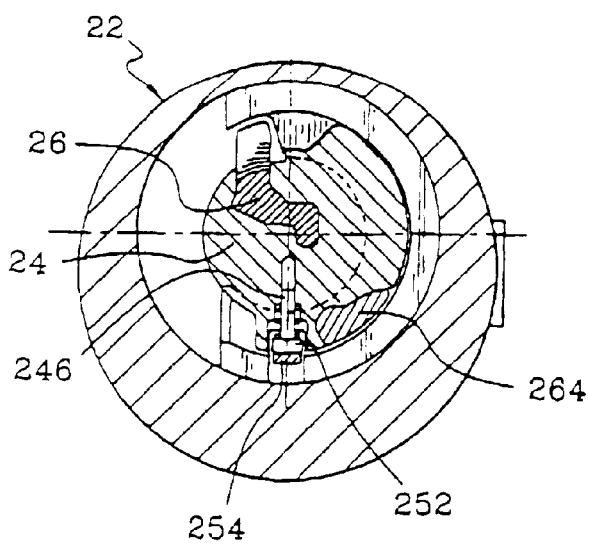
FIG. 13A is a view in transverse section similar to those of FIGS. 10A and 10B, depicting the rear end of the latch bolt shank in its position corresponding to FIGS. 12B and 14A.
Figure 13B:
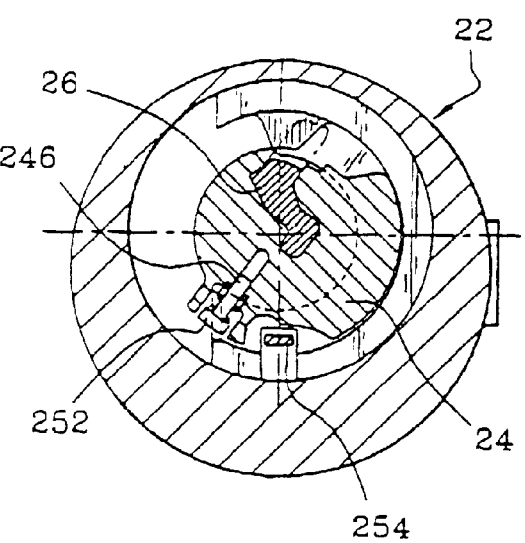
FIG. 13B is a view similar to that of FIG. 13A depicting the rear end of the latch bolt shank in its position corresponding to FIG. 12C.
Figure 13C:
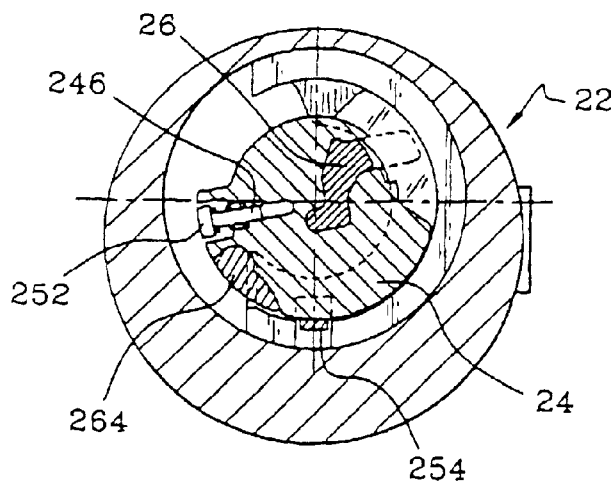
FIG. 13C is a view similar to that of FIG. 13A depicting the rear end of the latch bolt shank in its position corresponding to FIG. 12D.

For this purpose, during the return travel in the counter clockwise direction starting from the on position of FIG. 11D, the bearing surface 210 acts on the ball 70 and the switch 32 which, after a time delay, causes power to be applied to the electromagnet and therefore causes the rod 82 to be retracted, to allow the extreme angular position known as "STOP" to be reached once again. This withdrawal of the rod 82 is possible only after the user's electronic identifier code has been verified.

The means for exchanging and verifying the identifier code are not depicted and are of a generally known design, whether this be a transponder associated with an antenna of the vehicle, worn or carried by the driver in the case of a so-called "hands-free" antitheft system, or introduced into a reader onboard the vehicle.

The application of power to the electromagnet 30 is controlled by a time delay in case the user should return the rotor 24 to the stop position without then pulling on the knob 38, and therefore on the rod 26. In such a case, the rod 82 of the electromagnet 30 is once again free in the notch 152 and the knob 38 can no longer be turned in the direction corresponding to switching the engine on and starting, even though the steering column is not immobilized.

In order to obtain such immobilization of the steering column shaft in terms of rotation, which immobilization will be explained in detail later, and starting from the return position illustrated in FIG. 11B, the user pulls the knob 38 and the control rod 26 axially back, which once again causes a change in state of the switch because the ball leaves the surface 204 and "drops" into the slot 208 in line with the ramp 206. This change in state allows the rod 82 to be released once again and this rod axially enters the notch 152 backward. This deliberate withdrawal of the "key" 38-26 therefore causes rotational immobilization of the rotor 24 of the manual control key 38-24-26 and release of the latch bolt 36 which rotationally immobilizes the steering column.

The two extreme axial positions, pulled and pushed, of the rod 26 with respect to the rotor 24 and therefore with respect to the antitheft mechanism 22 are indexed using a ball-spring assembly 214 depicted in FIG. 1.

When the knob is pushed in again with a view to releasing the steering column and with a view to therefore allowing the rotor 24 to rotate, this rotor taking with it the cam 132 controlling the latch bolt 36 and driving the rotary interrupter 34, the action on the ball 70 (corresponding to the passage from the position of FIG. 11A into that of FIG. 11B) gives rise to interrogation of the identifier by the electronic antitheft system with a view to verifying that the code received from the identifier by the electronic antitheft circuit is correct, then causes power to be applied to the electromagnet 30, the application of power to which is made possible by the electronic circuit carried by the board 62 which has received a signal indicating that the code is correct.

This application of power is also subject to a time delay so as to immobilize the rotor 24 once again if the driver should push the knob 38 in without then turning it.

The assembly consisting of the rotor 24 and of the rod 26 in the stator 22–40 is here supplemented by a rear plate 218 forming a cover which is crimped onto the stator to axially retain the rotor 24 in the mounted position and prevent the rod 26 from being extracted axially backward from the rotor 24.

Likewise, when the rotor with its rear portion 116 is in position in the stator 22–40, it immobilizes the cassette 28 in the mounted position, that is to say that it is then impossible to extract it radially from the intermediate cavity 46, this being because of the collaboration of complementary shapes comprising, in particular, the peripheral convex cylindrical surface of the portion 116 which extends opposite a portion of the concave complementary cylindrical surface 92 of the cassette 28.

The latch bolt 36 and its control means will now be described.

In the known way, the rear axial end 220 of the solid body of the latch bolt 36 is connected to an axial puller 222 of cut sheet metal which is connected to it axially with the interposition of a known "tooth crest" spring 224 for the event that the latch bolt does not face a notch of the shaft of the steering column.

As can be seen in FIGS. 12A to 12D, the rear profile 226 of the cam 132 collaborates with a control finger 228 carried by the upper face of the puller 222 which is constantly urged elastically axially forward by a helical compression spring 230 which pushes the latch bolt 36 toward its deployed forward position for immobilizing the steering column shaft as depicted in FIG. 14A.

As can be seen particularly in FIG. 14A et seq., the connecting beam 44 is hollow to allow the passage of the puller 222.

The beam 44 thus delimits an internal corridor 232 of rectangular cross section, the bottom 236 of which comprises a known ramp 238 which is continued backward by a flat 240 which collaborates in a known way with a double tab 244 forming a cam of the rear part of the puller 222 which also constitutes a lower and rear tab 244 for retaining the latch bolt in the retracted rear position when it is to the rear of the flat 240 as illustrated in FIG. 14A.

The rear part of the puller 222, and therefore the tab 244, is pushed downward when considering FIG. 14A, by a radial latch bolt retaining finger 246 which is mounted to slide radially in a radial drilling 248 formed in the rear portion 49 of the body of the stator 22.

The radially outer lower head 252 of the finger 246 extends facing the rear shank 254 of the puller 222 to prevent the latter from disengaging, that is to say to prevent the tab 244 from passing over the flat under the action of the spring 230 and the ramp effect resulting from the inclination of the tab 244.

The retaining finger 246 is held radially outward in the puller retaining position, also known as the latch bolt antirelease position, for as long as it cannot rise back up, radially inward, under the action of the helical compression return spring 256 which constantly acts upon it.

The drilling 248 is formed, at its upper part, radially toward the inside, in a cylinder 258 formed in the rotor 24 and which opens at its radially inner end so that the free end 260 of the finger 246 can collaborate or not with a corresponding surface 262 facing it belonging to the rod 46.

Thus, as can be seen in FIG. 14B, when the rod is in the pushed-in axial position, the finger is immobilized in the position for retaining the latch bolt even when the rotor 24, with the control rod 26 pushed in, turns to allow the vehicle engine to start.

Figure 14C:
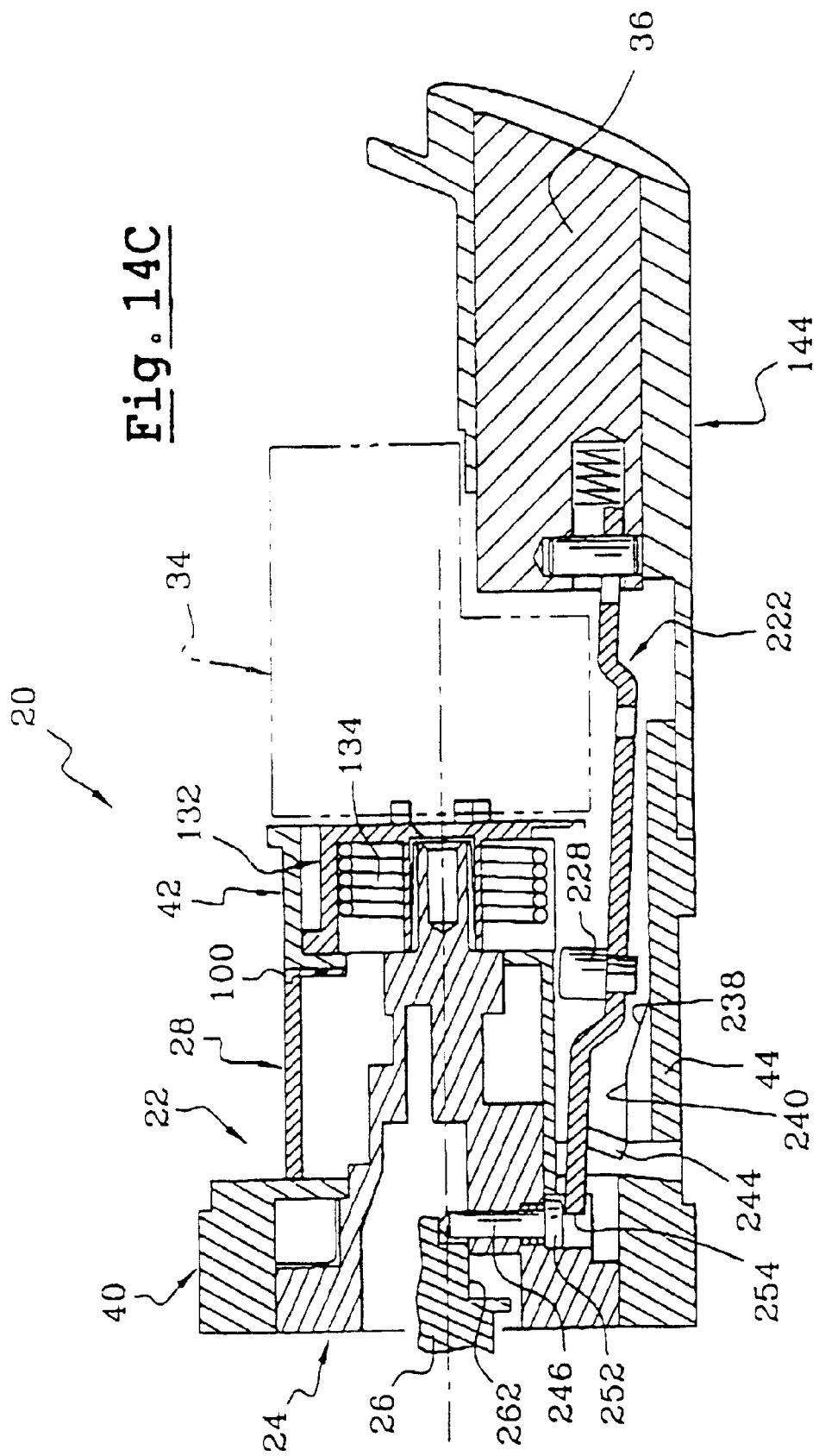
FIG. 14C is a view similar to that of FIG. 14A, in which the latch bolt is in an intermediate axial position in the process of unlocking.

By contrast, as can be seen by studying FIGS. 14B, 14C and 14A in turn, the axial retreat backward of the rod 26, that is to say the action of "pulling" the knob 38, causes the finger 246 to retract and to release the latch bolt 36 because the puller 22 can then be released.

In the known way, to allow the steering column to be released again and to lock the latch bolt 36 and the puller 222 in the rear axial position, there is an axial pusher 264 which can be retracted back under the action of the rear axial end of the rear shank 254 of the puller 222, this being against the action of an axial compression spring 266, the pusher being guided in a housing 268 of the rear transverse face of the rotor 24.

It will be noted that the immobilization of the steering column is suppressed before the indexed "ACCESSORIES" angular position is reached and therefore before the engine is started.

All of the relative movements of the components involved in drawing back and releasing the latch bolt 36 are illustrated with reference to FIGS. 12A to 14C.

From the secure operation point of view, the antitheft system according to the invention is particular reliable in so far as it calls upon no electrical energy to keep the knob 38 prevented from rotating. The level of security of the antitheft mechanism itself is at least equal to that of a conventional mechanical antitheft mechanism.

From the ergonomic point of view, as far as the driver is concerned, use and manipulation are in all respects similar to those of an antitheft mechanism with a removable mechanical key except for the fact that the manual control member forming a key 24, 26, 38 remains permanently in place on the steering column.

The knob 38 cannot be turned until after the electronic identifier has been recognized, and if it is not recognized, it is not possible to suppress the immobilization of the steering, or to start the vehicle engine.

It is impossible to cause the latch bolt 36 to be released as long as the rotary knob 387 is not in the extreme angular position known as the "STOP" position.

The incorporation of at least some of the components of the electromagnet control circuit into the electronic-mechanical module that the cassette 28 constitutes further improves the security of the entire vehicle antitheft system.

This is because this electronic circuit which is "internal" to the antitheft mechanism 20, 22, 28 needs to send an encoded signal to the antitheft mechanism in order that, in the event of an attempted break-in, it is not possible, by cutting the electric wires (not depicted) providing the connections between the anti-theft mechanism and the main decoding circuit, to cause power to be applied to the monostable electromagnet 30 simply using an electrical power supply.

In order to improve security still further, it is possible (according to an undepicted variant) to provide a rotational connection particularly between the knob and the rod, which acts as a "fuse", that is to say which breaks if there is an attempt to force the knob 38 to turn when rotation of the entire rotary assembly 38-26-24-132-34 is prevented from rotating by the rod 82 of the electromagnet 30.

It is also possible to provide a disengageable link between the rotor and the knob associated with the rod, which link is controlled by the monostable immobilizing electromagnet itself or by another electromagnet built into the cassette 28.

The latch bolt 36 may also be retained and released by other known means such as a tilting finger system, for example, with the known design developed by the applicant.

The latch bolt 36 may also be of axial overall orientation, but making an angle with respect to the axis A with a casing 144 shaped for this purpose.

By way of a variant, not depicted, it is possible to envision for the rod of the electromagnet to immobilize the rotary assembly 38-26-24-132-34 in terms of rotation by being received in a notch 152 associated with a groove 150 formed, for example, in the cam 132, the arrangement of the electromagnet 30 being, for example, the reverse so that its rod projects axially forward.

The indexing of the various angular positions of the rotary assembly 38-26-24-132-34 can also be achieved by collaboration with the cylindrical periphery of the cam that controls the withdrawal of the latch bolt.

Depending on the type of steering column, and therefore on the various dimensions and sizes, the printed circuit board may also be arranged parallel overall to the axes A and B.

When the identification system, for example of the "hands-free" type fails, it is possible to provide a backup solution (not depicted) involving a backup antenna of known design formed in the body of the antitheft mechanism 20 near its transverse rear end face.

This antenna therefore allows reading by interchange with a backup transponder/identifier contained in an element, the overall shape of which is that of a mechanical key, the front shank of which is introduced axially into an axial hole provided for this purpose in the manipulating knob 38.

Thus, the backup transponder is positioned correctly with respect to the antenna.

It is therefore also envisioned for the backup identifier housed in the antitheft mechanism not to be extractable from the latter as long as the knob 38, and therefore the rotary assembly 38-26-24-132-34 has not returned to the "STOP" angular position and/or as long as the knob 38 has not been returned axially to the pulled back position.

It is also possible for the monostable electromagnet to be replaced by an electric motor which drives an element that immobilizes the rotary assembly in terms of rotation.

What is claimed is:

1. A motor vehicle antitheft system comprising an antitheft mechanism comprising a housing in which a member for manually controlling the starting of the vehicle engine and the locking of the vehicle steering column
    is mounted so that it can move axially between a pulled back position in which it locks the steering column and a pushed forward position in which it unlocks the steering column,
    is mounted so that it can rotate between at least one angular position of rest and one angular position of use in which it cannot be pulled axially back,
    is connected in terms of rotation to a rotary output member forming a cam which is capable of collaborating with a control finger carried by a latch bolt to control the movements of the latter which is mounted to slide with respect to the housing between a deployed antitheft position toward which it is elastically urged and in which it projects through an opening of the housing to immobilize in terms of rotation one member of the steering column when the manual control member is in the angular position of rest and in the pulled back locked position, and a pushed-in position retracted inside the housing,
    and is connected in terms of rotation to a switch/interrupter assembly, which system comprises a unit for identifying an authorized user of the vehicle, which, after an interrogation and identification step, emits an encoded antitheft signal, and wherein the antitheft mechanism comprises:
        a motorized electromagnetic member for immobilizing the manual control member in terms of rotation with respect to the housing, the release of which is controlled when an encoded antitheft signal is supplied by the identification unit to an electronic circuit that controls the immobilizing member;
        and a switch which triggers an interrogation and identification step, which is carried by the housing and is triggered by the manual control member.

2. The motor vehicle antitheft system as claimed in claim 1, wherein the manual control member comprises an axially inclined ramp for controlling the triggering switch which acts on an actuating member thereof when the manual control member is pushed in or pulled axially between its two extreme axial positions, namely the pulled back locked position and the pushed forward unlocked position.

3. The system as claimed in claim 2, wherein means are provided for axially indexing the manual control member in each of its two extreme axial positions.

4. A motor vehicle antitheft system as claimed in claim 3, wherein the triggering switch comprises an actuating member on which the manual control member acts when it is rotated from its extreme angular position of rest to its position of use, or in the opposite direction.

5. The antitheft system as claimed in claim 4, wherein the actuating member is an actuating ball with which the control ramp or a lateral flank of the manual control member collaborates.

6. The antitheft system as claimed in claim 5, wherein the control ramp is extended axially backward by a cylindrical bearing parallel to the axis and is delimited laterally by said lateral flank.

7. The antitheft system as claimed in claim 6, wherein the manual control member comprises a rotor which is mounted so that it can rotate with respect to the housing which forms a stator, between two extreme angular positions, one of which corresponds to said angular position of rest and which is immobilized axially with respect to the stator, and a control rod which is mounted so that it can slide axially with respect to the rotor, to which it is connected in terms of rotation, between a pulled back locked position and an extreme forward unlocked position.

8. The antitheft system as claimed in claim 7, wherein said ramp is formed on the control rod.

9. The system as claimed in claim 8, wherein means are provided for axially indexing the control rod with respect to the rotor in each of its two extreme axial positions.

10. The antitheft system as claimed in claim 9, wherein the control rod has a radial finger for axially holding the control rod in the pushed forward position which, when the rotor leaves its angular position of rest, extends facing a front annular transverse abutment face of the stator to prevent the control rod from retreating axially backward and which, when the rotor is in its angular position of rest, faces a complementary axial groove so as to allow the axial movements of the control rod in both directions between its two extreme axial positions.

11. The antitheft system as claimed in claim 10, wherein the electromagnetic member for immobilizing the manual control member in terms of rotation collaborates with the rotor to immobilize it in terms of rotation.

12. The antitheft system as claimed in claim 11, wherein the electromagnetic immobilizing member is an electromagnet of axial orientation, a core plunger of which is urged elastically into the deployed position by a return spring so that it is housed in at least one immobilizing notch formed in an element connected in terms of rotation to the manual control member when the latter is in its angular position of rest, and wherein it can be electromagnetically returned to the pushed-in position so as to release the manual control member in terms of rotation.

13. The antitheft system as claimed in claim 12, wherein the immobilizing notch is formed in an annular front face of the rotor of the manual control member.

14. The motor vehicle antitheft system as claimed in claim 13, wherein the electromagnetic immobilizing member and the triggering switch belong to a subassembly constituting a disassemblable part of the housing.

15. The antitheft system as claimed in claim 14, wherein the disassemblable part is of annular overall shape and has the manual control member passing axially through its center.

16. The antitheft system as claimed in claim 15, wherein the disassemblable part comprises a printed circuit board in the shape of a flat annulus oriented transversely which carries said switch and the electromagnetic immobilizing member.

17. The antitheft system as claimed in claim 16, wherein the latch bolt is mounted so that it can slide axially parallel to the axial direction of travel of the manual control member.

18. The antitheft system as claimed in claim 17, wherein the latch bolt is mounted so that it can slide in a direction which is generally radial with respect to the axial direction of travel of the manual control member.

19. The antitheft system as claimed in claim 7, wherein the rear axial end of the control rod is connected in terms of axial translation and in terms of rotation to an operating knob by "fuse" means which break under the action of a torque of determined value.

* * * * *